United States Patent [19]

Bell

[11] 4,312,753
[45] Jan. 26, 1982

[54] INTANK FUEL FILTER

[76] Inventor: Steven L. Bell, 11127 Beaconsfield, Detroit, Mich. 48224

[21] Appl. No.: 232,391

[22] Filed: Feb. 9, 1981

Related U.S. Application Data

[63] Continuation-in-part of Ser. No. 112,918, Jan. 17, 1980, abandoned.

[51] Int. Cl.³ .............................................. B01D 35/02
[52] U.S. Cl. ................................. 210/250; 210/416.4; 210/461
[58] Field of Search ............... 210/250, 416.4, 460, 210/461, 486

[56] References Cited

U.S. PATENT DOCUMENTS

| | | | |
|---|---|---|---|
| 1,865,209 | 6/1932 | Pretsch | 210/461 |
| 2,015,274 | 9/1935 | Johnston | 210/250 |
| 3,875,059 | 4/1975 | Maschino | 210/416.4 |
| 3,900,397 | 8/1975 | Bell | 210/416.4 |
| 4,057,500 | 11/1977 | Wager | 210/486 |
| 4,129,503 | 12/1978 | Joseph | 210/460 |

Primary Examiner—John Adee

[57] ABSTRACT

An intank fuel filter of flexible woven plastic cloth having spacer means comprising protuberances secured to at least one of the flexible walls and projecting toward the opposite wall to hold the walls against collapse blocking fuelflow. The protuberances may extend completely through the flexible wall to provide external spacers to hold the filter away from the fuel tank wall. Tensioning of certain filters herein with a stiffly resilient rib structure (within opposed plastic cloth filter walls sealed at their marginal edges) against a bottom wall of the fuel tank permits fuel intake even if fuel is low and such bottom wall bows away from the fuel pump.

17 Claims, 14 Drawing Figures

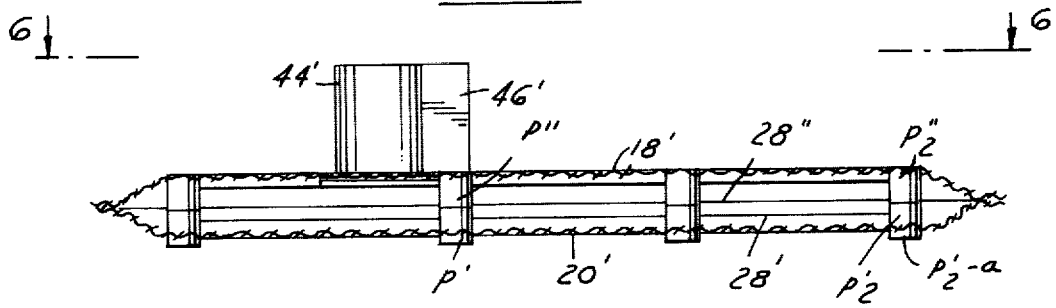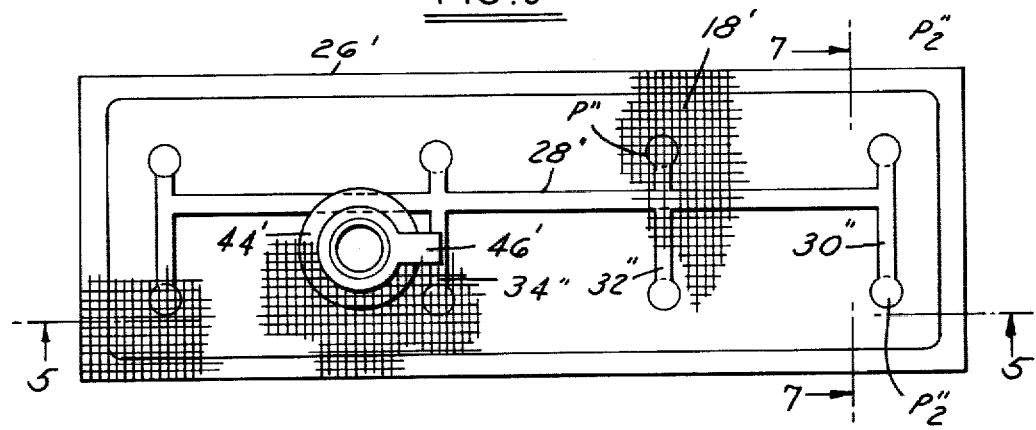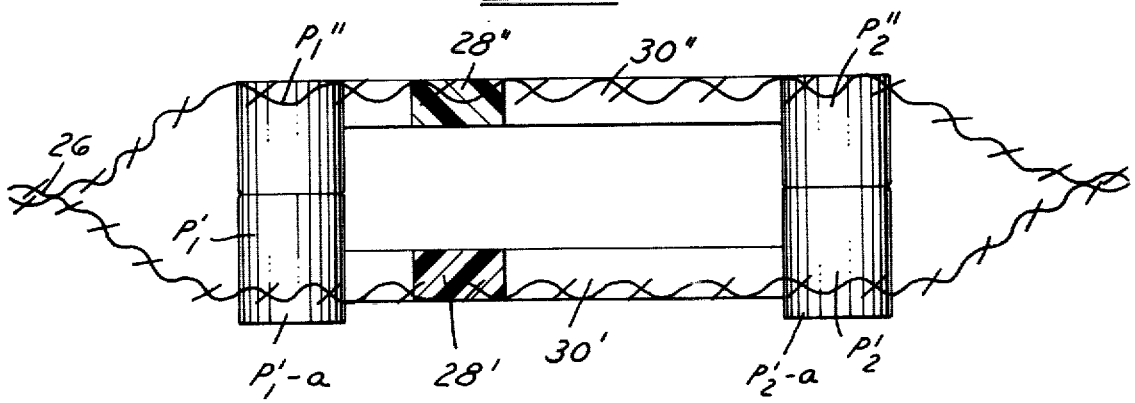

INTANK FUEL FILTER

DESCRIPTION

1. Cross Reference to Related Cases

This case is a continuation-in-part of U.S. Ser. No. 112,918 filed Jan. 17, 1980, now abandoned entitled INTAKE FUEL FILTER, which is hereby incorporated by reference.

2. Field of Invention

This invention relates generally to automotive fuel filters and more particularly to an intank filter to be connected to the inlet end of the automotive fuel system such as the inlet tube or directly to the intake of an intank fuel pump.

BACKGROUND OF THE INVENTION

Automotive fuel systems generally incorporate a fuel filter connected to the end to the fuel pickup line within the fuel tank. When a fuel pump is placed within the tank, then the filter is connected to the intake end of the pump. In any event, the filter may be capable of separating water as well as particulate matter from fuel as shown in U.S. Pat. No. 2,788,125. Many current tanks are of a shallow, flat configuration which makes desirable the withdrawal of the fuel from a point quite close to the bottom in order to make use of substantially all the fuel tank capacity. Since these shallower tanks of larger horizontal area have a greater capacity per inch of fuel depth, it becomes important that it be possible to remove the last inch or so of fuel from the bottom of the tank and this has made mecessary positioning the filter against, or at least in close proximity to the bottom wall of the tank. Filters designed to be disposed adjacent or against the bottom wall of the automotive fuel tank are shown representatively by U.S. Pat. No. 2,788,125; 2,826,372 and 3,900,397. With the advent of intank fuel pumps, it is possible to create a good suction at the filter, and this, combined with the necessity of disposing the filter against the bottom of the tank, has made it necessary to insure that fuel flow through the filter walls is not blocked either by the filter collapsing or by the filter wall being sucked against the tank wall thereby shutting off fuel flow.

U.S. Pat. Nos. 1,999,628 and 3,826,372 show spacer means within fuel filters for holding the walls apart. In addition, there is a filter commercially available having a plastic foam insert that is intended to hold the filter walls in distended position. This foam spacer is liable to have pieces break off which can enter the fuel system causing serious difficulties and the spacer means shown in the aforementioned patents substantially raise the cost of the filter.

It is therefore desirable that a filter be provided which can be economically manufactured without expensive modifications in existing manufacturing processes, and which filter will have its walls held apart despite the creation of a strong fuel suction within the filter, and wherein means are provided for holding the filter spaced slightly from the fuel tank bottom or other wall so that essentially all of the fuel in the tank may be drawn into the filter without the filter wall being sucked against the bottom wall of the tank blocking fuel flow.

SUMMARY OF THE INVENTION

I have provided an improved intank fuel filter formed of flexible woven plastic cloth having the capability, if desired, of filtering water from a hydrocarbon fuel, as well as filtering particulate matter, which may be disposed in juxtaposition with the bottom wall of the fuel tank and which is provided with means for preventing the bottom wall of the filter from being sucked against the bottom wall of the tank, cutting off fuel flow therethrough, and also having spacer means for preventing inward collapse of the flexible filter walls which would cut off fuel flow through the interior of the filter. The spacer means is not subject to having pieces broken therefrom which may clog the fuel system. The filter is designed so that it may be mounted directly to the inlet of an intank fuel pump. The design may be economically manufactured with only routine modifications of existing manufacturing apparatus.

In carrying out the invention, spacer means are provided within the filter envelope. Such spacer means may comprise a rib structure which extends longitudinally of the filter and is secured to one of the flexible walls and includes protuberances extending toward the opposite flexible wall such that when a partial vacuum is drawn within the filter, the protuberances will prevent the opposed flexible walls from completely collapsing together cutting off hydrocarbon fuel flow. The spacer means may be incorporated in that flexible wall of the filter which juxtaposes the fuel tank wall and may extend through the flexible wall to abut the fuel tank wall and space the flexible wall from the fuel tank, thereby preventing blocking of fuel flow into the filter through such wall, and also preventing wear of the filter cloth from abrasion between the fabric and tank wall. In a modified form of the invention, opposed flexible filter walls are each provided with rib structures each having protuberances extending toward the opposite walls to facilitate spacing apart the flexible filter walls to prevent collapse which would cut off fuel flow through the filter.

I have also provided a method of drawing fuel from the bottom of a fuel tank when that bottom is subject to stretching, bowing or otherwise moving away from its original position. Since fuel intake devices are generally fixed to the fuel tank, flexing of the fuel tank bottom adjacent to the fuel filter may create a reserve of fuel that ordinary fuel filters cannot reach effectively. In this method aspect of my invention, the fuel filter is tensioned against a bottom portion of the fuel tank so that part of the filter moves with movement of the bottom portion of the tank. This is accomplished with a rib structure, as aforementioned, which is stiffly resilient so as to follow movement of the bottom portion of the fuel tank.

BRIEF DESCRIPTION OF THE DRAWINGS

FIG. 5 is a side elevation view of a modified form of the filter;

FIG. 6 is a top plan view taken on the line 6—6 of FIG. 5;

FIG. 7 is a cross-sectional view taken on the line 7—7 of FIG. 6;

DESCRIPTION OF PREFERRED EMBODIMENTS

Figure 1:
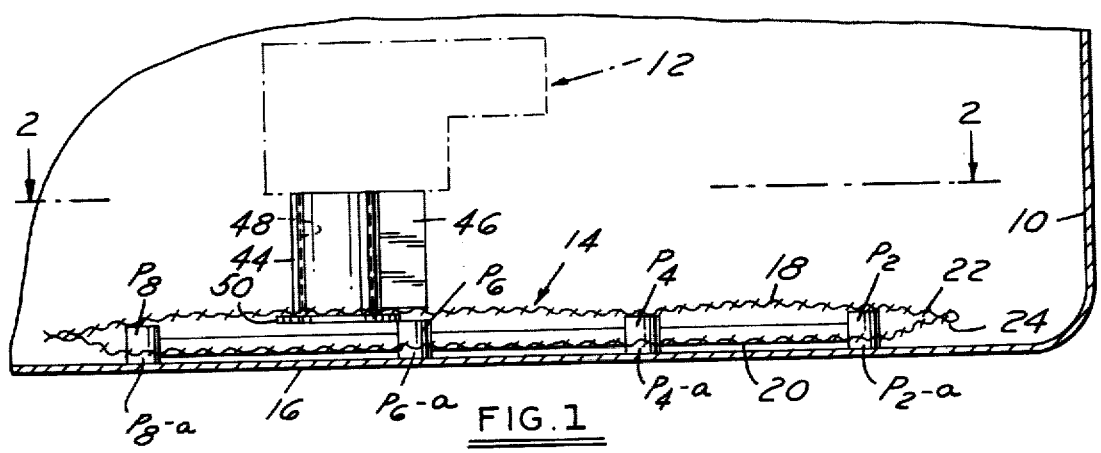
FIG. 1 is a diagrammatic elevation view showing a filter embodying my invention attached to an intank fuel pump disposed within an automotive fuel tank.

Referring to the drawings, I have shown a portion of an automobile fuel tank 10 in FIG. 1 within which is disposed an intank fuel pump 12 to the inlet of which is connected my improved filter 14. The filter is disposed in close proximity to the bottom wall 16 of the fuel tank and may rest thereagainst as shown in FIG. 1.

Figure 2:
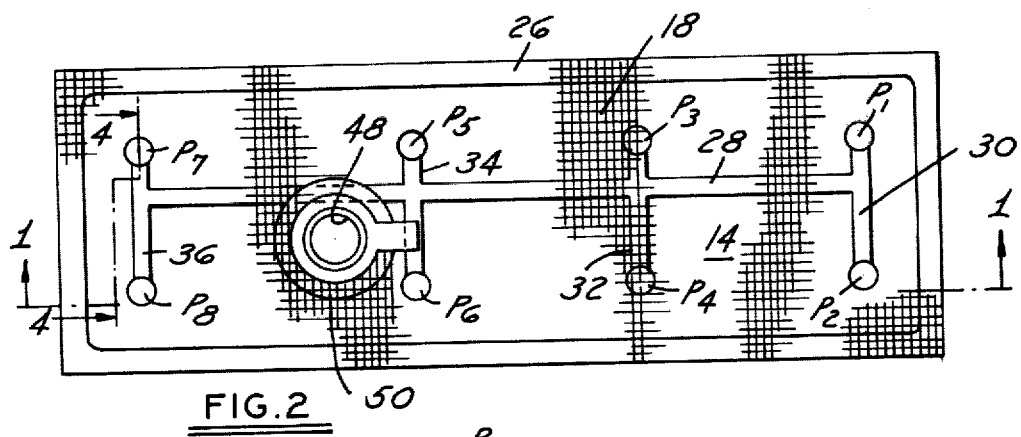
FIG. 2 is a top plan view taken on the line 2—2 of FIG. 1.

The filter comprises opposed elongated flexible woven plastic fabric walls 18 and 20 having coincident marginal edges 22 and 24 which are joined together as by heatsealing, adhesive, or in any other suitable fashion entirely around the periphery of the filter as at 26 in FIG. 2.

The fabric from which the flexible walls are made may be of a variety of materials capable of either separating water from the fuel or not, as desired, but in any event capable of separating out particles of dirt or other contaminating media. Reference should be made to U.S. Pat. No. 2,788,125 for a description of typical plastic fabrics which will be suitable for this purpose. Reference may also be had to U.S. Pat. Nos. 3,826,372; 3,023,905 and 3,900,397 for further examples of suitable fabric material and design parameters.

In order to prevent the flexible opposed walls 18 and 20 of the filter from collapsing inward under the strong suction of the fuel pump 12, I provide spacer means within the filter adapted to hold these flexible walls in spaced relation against the partial vacuum created within the filter by the pump. Such spacer means may comprise a rib structure 28 which extends longitudinally of the elongated walls 18 and 20 and is disposed within the filter between such walls. The rib structure is preferrably formed of plastic, and the plastic may be of the same material as are the fabric walls. The rib structure is provided with a plurality of transverse branches 30, 32, 34, 36, at opposite the ends of which are protuberances $P_1$, $P_2$, $P_3$, $P_4$, $P_5$, $P_6$, $P_7$ and $P_8$ integral with the branches and rib structure. The protuberances are secured, as is the rib structure, to the flexible fabric cloth. This may be best accomplished by the rib structure, including the branches and protuberances, being formed or cast in situ on the fabric such that the plastic rib branch and protuberance structures extend partially or completely through the fabric as shown best in FIG. 4. In such Figure the rib 28 and its branch 36 are partially embedded in the fabric wall 20 while the projections $P_7$ and $P_8$ extend completely through the woven fabric to form projections $P_7$-a and $P_8$-a on the outside of the bottom wall 20 of the filter.

Figure 4:
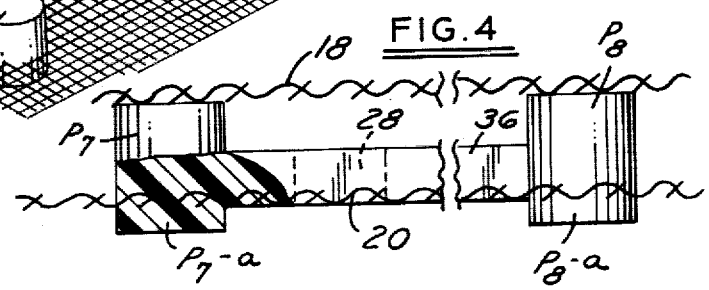
FIG. 4 is a cross-sectional view taken on the line 4—4 of FIG. 2.

The inwardly extending projections, for example, projections $P_7$ and $P_8$ as shown in FIG. 4, project toward the opposite wall 18 of the filter to abut the same and hold the bottom wall 20 in spaced relation therefrom to prevent the inward collapse and contact of the walls 18 and 20 which would block fuel flow through the filter. The outwardly extending projections $P_7$-a and $P_8$-a which are disposed on the outside of the wall 20 are adapted to engage the bottom wall 16 of the fuel tank to space the flexible wall 20 from the tank wall and thereby prevent the blocking of fuel flow through the filter wall 20 by virtue of the wall being sucked against the tank wall under partial vacuum created by fuel pump 12 and also preventing abrasive action between the fabric and tank wall.

The rib structure 28, as well as the branches 30, 32, etc., at the time of being molded in situ on the flexible wall 20, is bonded to such wall by virtue of the plastic material of the rib penetrating the interstices of the fabric and becoming locked in such interstices to the fabric material. Accordingly, the rib structure is securely fastened to the fabric wall. The rib structure serves to reinforce the filter against longitudinal and lateral collapse and the projections or protuberances P prevent inward collapse of the opposed flexible walls toward each other.

Means are provided for connecting the filter to the fuel pump 12 and for such purpose a port fitting 44 is provided. The port fitting may be formed of plastic and is of a generally cylindrical shape and may be provided with integral means of orienting the filter, 46. A bore 48 extends through the port fitting to permit the passage of fuel. Such bore communicates at its lower end with the interior of the filter through a flange 50 integral with the port fitting and disposed on the inside of the filter. The port fitting is desirably molded in situ against the fabric wall 18 with the fabric embedded in the flange 50. The port fitting 44 may be secured to the fuel pump in any suitable fashion. The bore 48 is of a larger diameter than the width of the rib structure 28 so that should the port fitting bore 48 become aligned with the rib, fuel flow will not be blocked. As shown in FIG. 2, the flange 50 is disposed opposite the rib structure 28 and the fitting bore 48 is offset from the rib structure.

Figure 3:
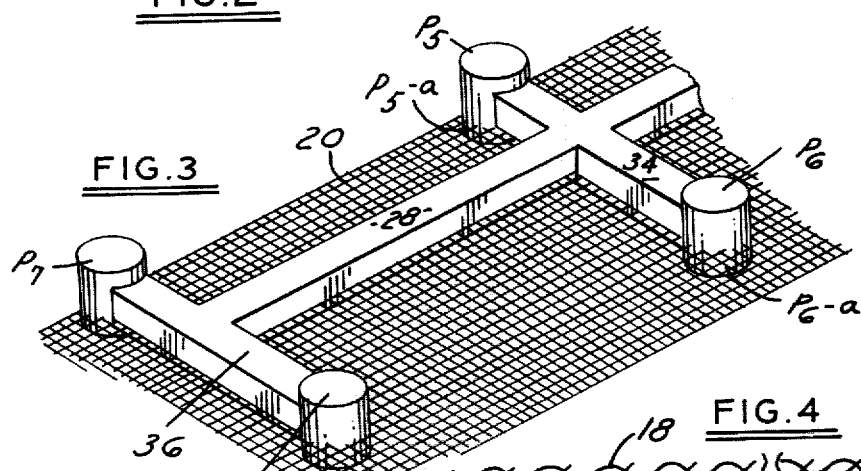
FIG. 3 is a perspective view of a portion of the rib structure of the filter in FIG. 1.

In FIG. 5, I have shown a modified form of my filter. In this embodiment, two rib structures are shown, a lower one indicated at 28' and an upper one at 28". These rib structures are similar to that disclosed in FIGS. 1–4, inclusive, but in this instance, the two rib structures cooperate in holding the opposed flexible walls in spaced apart relation. Each rib structure is provided with lateral branches as described in connection with FIGS. 2–4, inclusive, and I have shown some of these branches a ' numeral and for the upper branch with a " numeral in FIG. 6 where the rib structure is shown in plan view. Protuberances at the ends of the branches are also indicated by P' and P". The protuberances at the ends of the branches are arranged in confronting juxtaposition as shown best in FIGS. 5 and 7 where $P''_2$ is disposed opposite $P'_2$, the former being a part of the rib structure 28" and the branch structure 30", while the latter is a portion of the rib structure 28' and branch structure 30'.

The port fitting 44' is in all respects similar to that described at 44 in FIG. 1 except the same is integral with the rib structure 28" and for this purpose the filter orienting means 46' is integral with the branch 34" and the rib structure forms a continuation of the material of the port fitting, all of such being molded in situ against the fabric material.

As shown in FIG. 7, the projections of the opposed rib structures abut each other, serving to space apart the opposed flexible fabric walls of the filter and the spacing apart may be greater as a result than that shown in the first embodiment of FIGS. 1-4. The peripheral margin 26' of the filter may be heatsealed or secured by suitable adhesive.

Figure 8:
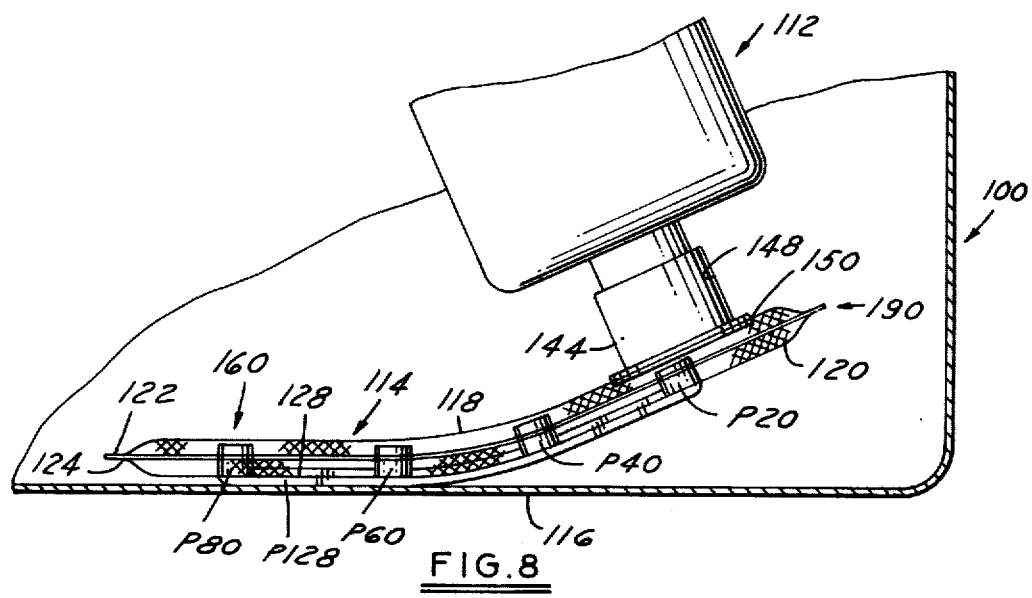
FIG. 8 is a diagrammatic elevation view embodying other aspects of my invention when the filter is attached to an intake fuel pump and tensioned against a wall of a vehicle fuel tank.

In FIG. 8, I have shown how my filter can be used to draw fuel from a large area on the bottom part of a fuel tank, even though such bottom part flexes away from the pump.

Figure 9:
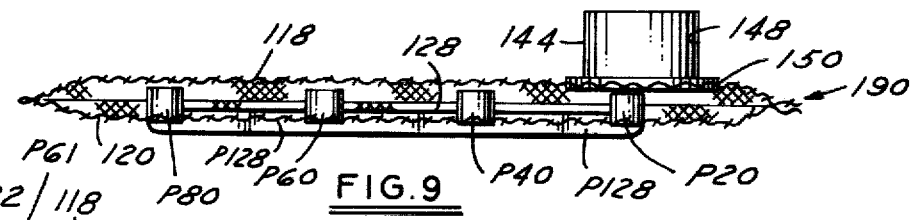
FIG. 9 is a side elevation view of the filter of FIG. 8 taken on the line of 9—9 of FIG. 10. The filter in FIG. 10 is not attached to the fuel pump.
Figure 11:
FIG. 11 is a cross-sectional view taken along the line 11—11 of FIG. 10.
Figure 10:
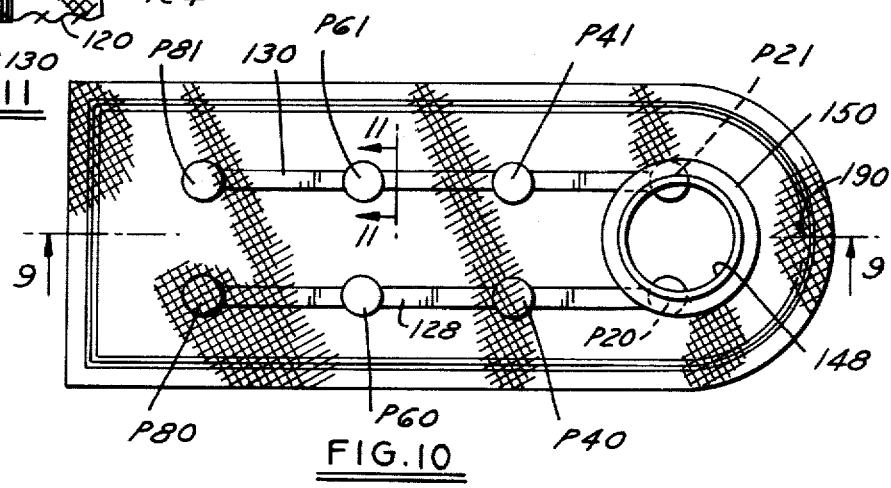
FIG. 10 is a top plan view of the filter of FIG. 8.

In FIGS. 9, 10 and 11, I also illustrate more fully the filter of FIG. 8.

Bottom walls of fuel tanks, such as 116 shown in FIG. 8, are subject to flexure downwardly in the direction shown by the arrows for a variety of reasons. Atmospheric conditions, for example, may cause the flexure. If the fuel tank is low on fuel, the remaining fuel may collect in the reservoir created by the flexure and be out of reach of other fuel filters. Fuel filter 114, however, reduces such a risk because it flexes with wall 116 to remain in close proximity therewith.

Referring more specifically to FIG. 8, I show a portion of an automobile fuel tank 100 within which is disposed an intank pump 112 to the inlet of which is connected my improved filter 114. Filter 114 is disposed at an angle to bottom wall 116. Filter 114 has top wall 118, bottom wall 120 sealed at their marginal edges 122 and 124, respectively, generally as shown in FIGS. 1-7. Also, similar as to what was shown in FIGS. 1-7, port fitting 144 is cylindrical and has bore 148 to permit passage of fuel. Such bore communicates with the interior of the fuel filter through flange 150 surrounding an orifice in wall 118. Port fitting 144 is solid but is preferably made of the same material, e.g. nylon, as walls 118 and 120 and ribs 128 and 130.

Ribs 128 and 130 (both shown in FIG. 10) enable tensioning of filter 114 against bottom 116 of tank 100 because they are stiffly resilient. Thus, although the other end of the fuel intake assembly may be fixed to the tank, flexed end 160 follows movement of bottom wall 116.

As illustrated by FIGS. 9, 10, and 11, ribs 128 and 130, respectively, extend through wall 120 to form projections P-128 and P-130. Projections P-128 and P-130 space wall 120 from tank bottom wall 116 similar to projections hereinbefore mentioned. Additionally, projections P-20, P-40, P-60 and P-80 of rib 128 and P-21, P-41, P-61 and P-81 of rib 130 discretely spaced walls 118 and 120 apart, such as previously mentioned in reference to FIGS. 1-7. Further, projections P-20 and P-21 maintain flange 150 a distance from bottom filter wall 120. If desired, projections P-21 and P-20 may be made with a top surface slightly larger than shown in FIG. 10 for manufacturing expedience in placement of flange 150 thereon.

In FIG. 11, I show projection P-61 and rib projection P-130 projecting from wall 120 along the short axis of filter 114. Both projection P-61 and rib projection P-130 are integral with rib 130.

Filter 114 differs from filters shown previously in that it has curved end 190 shown best in FIG. 10. Curved end 190 is closer to fitting 150 than corresponding filter portions of previously described filters. Curved end 190 is therefore more easily wet at very low levels of fuel in fuel tank 100.

Figure 12:
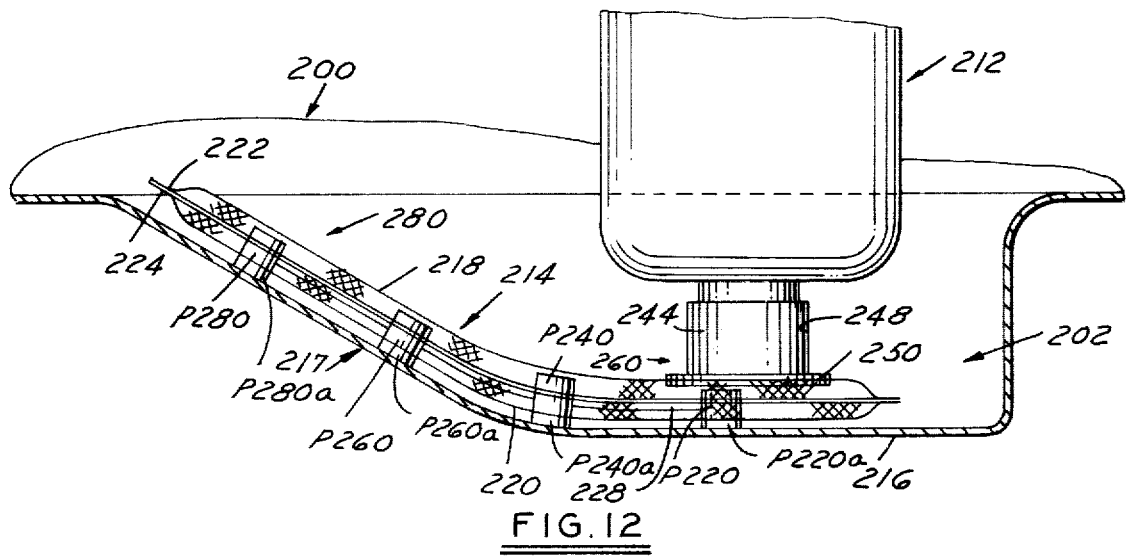
FIG. 12 is a diagrammatic elevation view embodying other aspects of my invention when the fuel filter is attached to an intank fuel pump disposed in a fuel tank sump.
Figure 13:
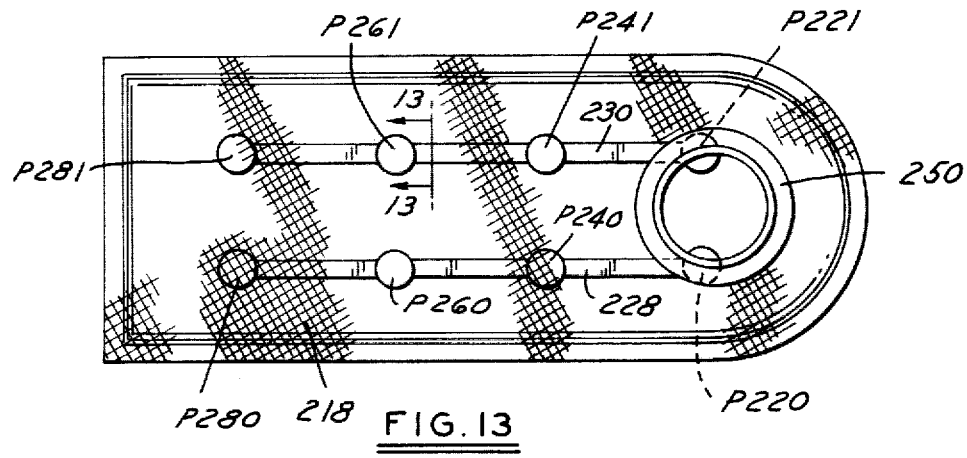
FIG. 13 is a top plan view of the filter of FIG. 12 when it is not attached to the fuel pump.
Figure 14:
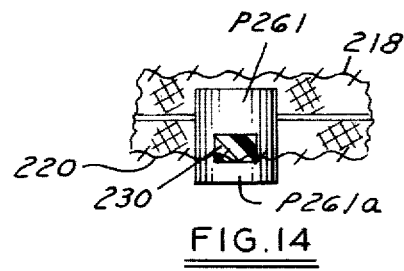
FIG. 14 is a cross-sectional view of the filter of FIG. 13 taken on the line 13—13 of FIG. 12.

FIGS. 12, 13, and 14 illustrate another of my filters, filter 214. Filter 214 is in sump 202 of fuel tank 200; it communicates to intank fuel pump 212 through bore 248 in fitting 244 having flange 250. Sump 202 has bottom wall portions 216 and 217 upon which filter portions 260 and 280 of filter 214 ride.

Like the embodiment in FIGS. 8-11, filter portion 280 follows flexure or other movement of wall 217. Ribs 228 and 230 assist in accomplishing this feature because they are stiffly resilient, i.e., are able to maintain a pressure against tank wall 217 after bending. Accordingly, filter 214 permits fuel to be drawn from precise locations within the sump.

Ribs 228 and 230, as I have illustrated in FIGS. 12-14, have respective integral projections P-220, P-240, P-260 and P-280 and P-221, P-241, P-261 and P-281 which project away from wall 220 toward wall 218 to space walls 218 and 220 apart and prevent collapse thereof. Projection portions 220-a, 240-a, 260-a and 280-a of respective projections 220-280, along with their counterparts in ribs P-221, P-241, P-261 and P-281, hold filter 214 from tank walls 216 and 217.

As I show in FIG. 14, rib 230 extends above wall 220 with projections such as P-261 extending above rib 230. Projection P-261(a), on the other hand, also extending along the short axis of filter 214, spaces filter fabric from bottom wall 217.

When I use "stiffly resilient" in connection with rib structures herein, I mean that the fuel filters with such stiffly resilient rib structures tend to revert to their original condition upon bending. Such stiffly resilient rib structures may be accomplished by choice of material, e.g., nylon rib elements. They, also, may be accomplished with softer materials (e.g., polyvinyl chloride) by rib geometry such as shown in FIGS. 8-14.

Generally, it is desirable that the fuel filters are made of similar material, that is, the wall and rib structures of the fuel filter are made of the same material, e.g., polyvinylidene chloride.

I claim:

1. An intank fuel filter comprising, in combination:
   opposed flexible fabric filter walls sealed together at their marginal edges;
   a rib structure molded in situ to one of said walls and projecting therefrom (a) toward the opposite wall to space the walls apart, preventing collapse, and (b) toward the tank wall to space the filter fabric from such wall; and
   means for connecting the interior space between the walls with a fuel intake for withdrawing fuel therefrom.

2. The invention defined by claim 1 wherein the filter is tensioned against a wall of the fuel tank and said rib structure is stiffly resilient.

3. The invention defined by claim 1 wherein said connecting means includes a fitting molded in situ to the other of said walls.

4. The invention defined by claim 1, 2 or 3 wherein said rib structure includes (a) a rib element extending longitudinally of the filter, and (b) projections integral with said rib element and extending beyond it on the short axis of the filter.

5. The invention defined by claim 4 wherein a first amount of said projections projects towards the opposite wall to space the walls apart and a second amount projects towards the tank wall to space the filter fabric thereabout from such wall.

6. The invention defined in claim 5 wherein a portion of said first amount projects from a lateral branch of said rib element.

7. The invention defined by claim 4 wherein a portion of said rib element projects on the outside of the filter toward the tank wall to space the filter fabric thereabout from such wall.

8. An intank fuel filter comprising, in combination: opposed flexible fabric filter walls sealed together at their marginal edges;
a stiffly resilient rib structure molded in situ to one of said walls, projecting therefrom (a) toward the opposite wall to space the walls apart, preventing collapse, and (b) toward the tank wall to space the filter fabric from such wall and including a rib element which extends longitudinally of the filter and carries integral projections extending beyond said rib element on the short axis of the filter; and
means for connecting the interior space between the walls with a fuel intake for withdrawing fuel therefrom.

9. The invention defined by claim 8 wherein said rib element includes laterally extending branches which carry an amount of said projections.

10. The invention defined by claim 8 wherein the said rib structure includes a pair of rib elements which project toward the tank wall to space the filter fabric from such wall.

11. The invention defined by claim 8 wherein an additional rib structure is molded in situ to the other of the walls and projects therefrom towards the opposite wall to space the walls apart.

12. The invention defined by claim 8 wherein an amount of said projections project towards the tank wall to space the filter fabric from such wall.

13. The invention defined by claim 8, 9, 10, 11 or 12 wherein the connecting means includes a port fitting secured to one of said walls and having a flange on the inside of the wall and opposite said rib element to abut the same when the walls are close together.

14. A method of drawing fuel from a bottom part of a fuel tank which comprises:
(A) providing a fuel filter which includes:
 (1) opposed upper and lower flexible fabric filter walls sealed together at their marginal edges;
 (2) means for connecting the interior space between said walls with a fuel intake for withdrawing fuel therefrom, including an orifice in said upper wall at a first location of the filter;
 (3) a rib structure molded in situ to said lower wall, (a) projecting therefrom (i) toward said upper wall to space said walls apart, preventing collapse, and (ii) toward the tank wall to space the filter fabric from such wall; and (b) extending longitudinally of the filter under said first location to a second location longitudinally remote from said first location; and
(B) positioning said first and second ends of the filter respectively including said first and second locations at different levels within the tank such that one of said ends contacts a bottom wall portion of the tank and is tensioned thereagainst, whereby during movement of said bottom wall portion said end, tensioned thereagainst, remains in close proximity therewith.

15. The invention defined in claim 14 wherein said rib structure includes a rib element which projects toward the tank wall to space the filter fabric from such wall.

16. The invention defined in claim 14 or 15 wherein said first end contacts a bottom part of said tank lower than said second end.

17. The invention defined in claim 14 or 15 wherein said bottom portion is lower than where said first end is positioned.

* * * * *